US012767143B2

(12) United States Patent
Hashimoto et al.

(10) Patent No.: US 12,767,143 B2
(45) Date of Patent: Oct. 20, 2026

(54) VEHICLE CONTROL DEVICE

(71) Applicant: TOYOTA JIDOSHA KABUSHIKI KAISHA, Toyota (JP)

(72) Inventors: Ryuta Hashimoto, Setagaya-ku (JP); Koshi Odagiri, Kawasaki (JP); Takahiro Seta, Yokohama (JP); Jun Hasegawa, Kawaguchi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 19/083,783

(22) Filed: Mar. 19, 2025

(65) Prior Publication Data

US 2025/0296569 A1 Sep. 25, 2025

(30) Foreign Application Priority Data

Mar. 21, 2024 (JP) ................................ 2024-045755

(51) Int. Cl.
*B60W 30/18* (2012.01)
*G06V 20/56* (2022.01)

(52) U.S. Cl.
CPC ..... *B60W 30/18163* (2013.01); *G06V 20/588* (2022.01); *B60W 2420/403* (2013.01); *B60W 2420/408* (2024.01); *B60W 2552/30* (2020.02); *B60W 2554/4042* (2020.02); *B60W 2554/406* (2020.02); *B60W 2556/20* (2020.02)

(58) Field of Classification Search
CPC ................ G06V 20/588; B60W 30/12; B60W 30/18163; B60W 2556/20; B60W 2554/406; B60W 2420/403; B60W 2420/408
See application file for complete search history.

(56) References Cited

U.S. PATENT DOCUMENTS 11,402,851 B2 * 8/2022 Stein .................... G05D 1/0276
12,106,574 B2 * 10/2024 Levi ....................... G01C 21/26
12,620,240 B2 * 5/2026 Huberman ........... G06V 20/584
2023/0128212 A1 4/2023 Azuma et al.
2025/0296569 A1 * 9/2025 Hashimoto ........... B60W 30/12
2026/0146865 A1 * 5/2026 Aharon .............. G01C 21/3822
2026/0159132 A1 * 6/2026 Ahn ................ B60W 60/00184

FOREIGN PATENT DOCUMENTS

JP 2004-171159 A 6/2004
JP 2022-177979 A 12/2022
JP 2023-064792 A 5/2023

* cited by examiner

*Primary Examiner* — John Kwon
(74) *Attorney, Agent, or Firm* — Dinsmore & Shohl LLP

(57) ABSTRACT

A vehicle control device has a processor configured to acquire road information for a location outside of a detection range of a sensor mounted in a vehicle, to determine whether reliability of the road information is high or low, based on determining information representing a location with a large degree of variation in road condition, to decide to interpret the road information at a lower resolution when it has been determined that the reliability of the road information is low, and to generate a plan to control the vehicle based on the road information that has been interpreted at lower resolution, when it has been decided to interpret the road information at a lower resolution.

5 Claims, 6 Drawing Sheets

VEHICLE CONTROL DEVICE

CROSS-REFERENCE TO RELATED APPLICATIONS

This application claims priority to Japanese Patent Application No. 2024-045755 filed Mar. 21, 2024, the entire contents of which are herein incorporated by reference.

FIELD

The present disclosure relates to a vehicle control device.

BACKGROUND

An automatic control device mounted in a vehicle may acquire from an external server any forward road information representing the state of the road outside of the detection range of the vehicle's sensor, in the traveling direction of the vehicle.

The server acquires the road condition of each lane detected by multiple probe vehicles traveling on the road, and sends the acquired information to the vehicle as road information. The road information includes vehicle speeds, obstacle locations and road surface conditions for each lane. The automatic control device generates a traveling lane plan, for example, based on the road information.

The road information is not necessarily guaranteed to be accurate. For example, the locations of objects on the road may not be accurate as detected by the probe vehicles.

Japanese Unexamined Patent Publication No. 2023-64792, for example, proposes a device that receives obstacle information from roadside devices including multiple sensors that detect obstacles within a predetermined visual field, and judges the reliability of the obstacle information.

SUMMARY

Because a road condition may vary as time progresses, the road condition can potentially change by the time the vehicle reaches the location represented by the road information.

Due to the additional factor of changing road conditions, therefore, it is desirable to determine the reliability of acquired road information.

It is an object of the present disclosure to provide a vehicle control device that determines the reliability of road information for locations where there is large variation in road conditions, and that controls the vehicle based on that reliability.

(1) One embodiment of the present disclosure provides a vehicle control device. The vehicle control device has a processor configured to acquire road information for a location outside of a detection range of a sensor mounted in a vehicle, determine whether reliability of the road information is high or low, based on determining information representing a location with a large degree of variation in road condition, decide to interpret the road information at a lower resolution when it has been determined that the reliability of the road information is low, and generate a plan to control the vehicle, based on the road information that has been interpreted at lower resolution, when it has been decided to interpret the road information at a lower resolution.

(2) In the vehicle control device of embodiment (1), the determining information represents a location where there is a large degree of time-dependent variation in the road condition, and the processor is further configured to determine that the reliability of the road information is low when the location represented by the road information matches a location where there is a large degree of time-dependent variation in the road condition represented in the determining information.

(3) The vehicle control device of embodiment (1), the determining information represents locations and time periods where there is a large degree of time-dependent variation in the road condition, and the processor is further configured to determine that the reliability of the road information is low when the location represented by the road information matches a location where there is a large degree of time-dependent variation in the road condition represented in the determining information, and the time at which the road information was acquired is within a time period with a large degree of time-dependent change in the road condition represented in the determining information.

(4) The vehicle control device of embodiment (1), the processor is further configured to generate determining information representing locations with a large degree of variation in road condition, between the locations as represented by the road information and areas near the locations represented by the road information, and to determine that the reliability of the road information is low when a location represented in the generated determining information matches a location represented by the road information.

(5) The vehicle control device of embodiment (1), the determining information represents locations where there is a large degree of variation in curvature radius of the road, and the processor is further configured to determine that the reliability of the road information is low when the location represented by the road information matches a location where there is a large degree of variation in curvature radius represented in the determining information, and the speed of another vehicle in the road information exceeds a reference speed estimated, based on a reference curvature radius.

Since the vehicle control device of the disclosure controls the vehicle while interpreting the road information at a lower resolution when the reliability of the road information is low at a location with a large degree of variation in road condition, it exhibits an effect of allowing the vehicle to be controlled in response to road conditions while the vehicle is traveling.

The object and advantages of the present disclosure will be realized and attained by the elements and combinations particularly specified in the claims. It is to be understood that both the foregoing general description and the following detailed description are exemplary and explanatory and are not restrictive of the present disclosure, as claimed.

DESCRIPTION OF EMBODIMENTS

Figure 1:
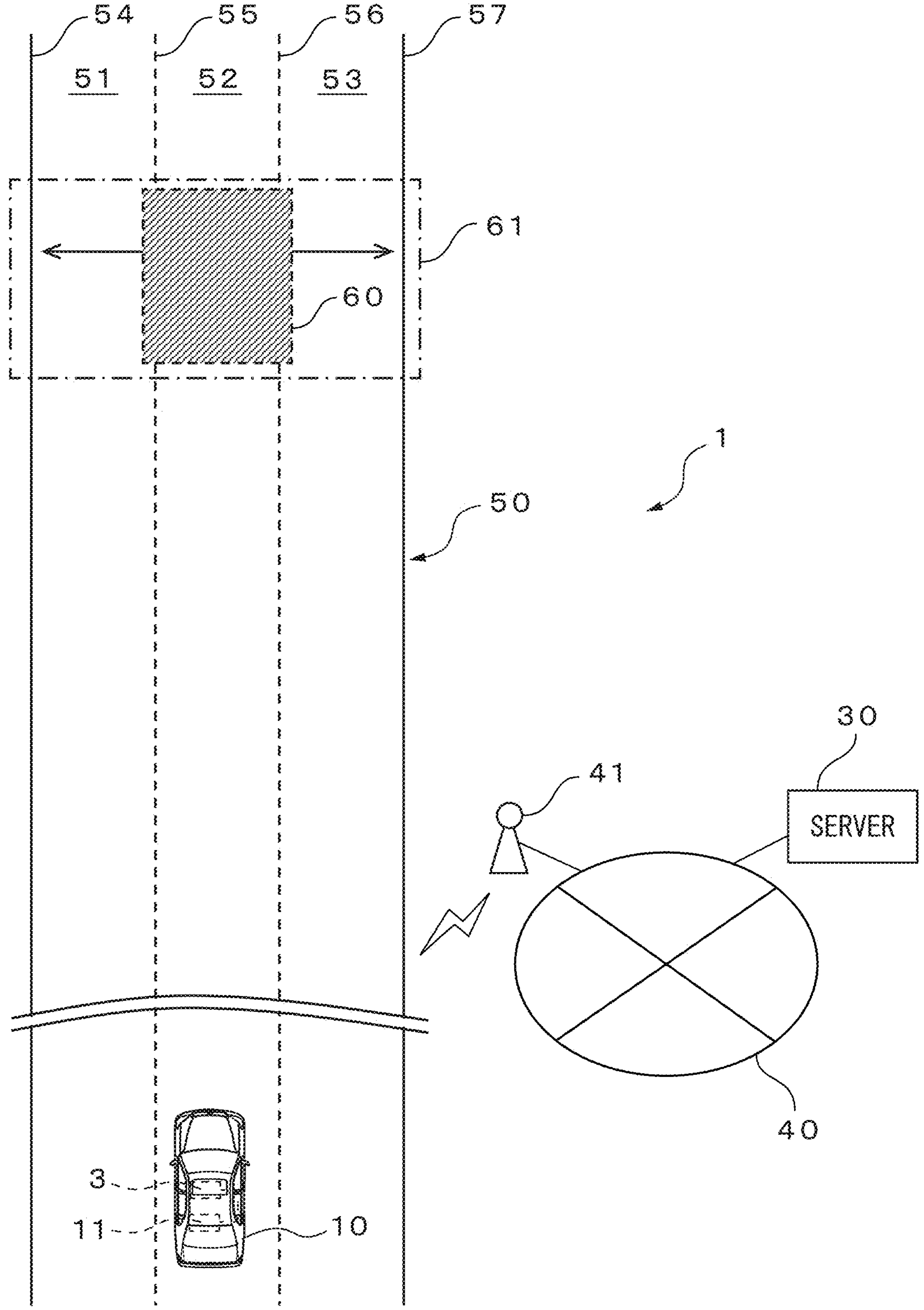
FIG. 1 is a general schematic drawing of a vehicle control system of the embodiment.

FIG. 1 is a general schematic drawing of a vehicle control system 1 in which an automatic control device 11 of the embodiment is mounted. The vehicle control system 1 has at least one vehicle 10 and server 30. The automatic control device 11 is mounted in the vehicle 10. For example, by accessing a wireless base station 41 (hereunder also known as a macrocell base station 41) which provides a macrocell connected with the server 30 via a communication network 40 and gateway (not shown), the automatic control device 11 is placed in connection with the server 30 via the macrocell base station 41 and communication network 40. The automatic control device 11 is an example of a vehicle control device.

Although only one vehicle 10 is depicted in FIG. 1, the vehicle control system 1 may have more than one vehicle 10. Likewise, more than one macrocell base station 41 may be connected to the communication network 40.

The vehicle 10 is traveling on a road 50. The road 50 has three lanes 51, 52, 53. The vehicle 10 is traveling on the lane 52. The lane 51 is demarcated by the lane marking line 54 and lane marking line 55. The lane 52 is demarcated by the lane marking line 55 and lane marking line 56. The lane 53 is demarcated by the lane marking line 56 and lane marking line 57.

The server 30 acquires information representing the road condition of each lane detected by multiple probe vehicles traveling on the road. The server 30 may also acquire information representing the road condition from a driver terminal or a roadside device. The server 30 sends the road information to the vehicle 10 via the communication network 40 and macrocell base station 41. The road information includes, for example, road locations, and vehicle speeds, obstacle locations and road surface conditions for each lane. The road information is sent at a sending time having a predetermined cycle, for example.

Roads are represented as a series of road zones in the map information of the server 30 and the automatic control device 11. One traffic lane is represented as a series of traffic lane zones. Each traffic lane zone is associated with the road zone that includes that traffic lane zone. The road information may also represent the road condition of each traffic lane zone. The road information can be represented as a road condition for each road zone.

The automatic control device 11 uses a communication device 4 to receive road information from the server 30 via the macrocell base station 41 and the communication network 40. The road information includes the road condition in the region outside of the detection range of the sensors mounted in the vehicle 10. The road information may also include the road condition in the region inside the detection range of the sensors mounted in the vehicle 10.

The automatic control device 11 controls operation of the vehicle 10, based on the information detected by the sensors mounted on the vehicle 10, and on the road information. The vehicle 10 may also be a self-driving vehicle, for example.

When the road information represents the road condition at a location outside of the detection range of the sensors mounted in the vehicle 10, the road condition may vary before the vehicle 10 reaches the location represented by the road information.

For road information, therefore, the automatic control device 11 therefore determines whether the reliability of received road information is high or low, based on determining information representing locations with a large degree of variation in road condition.

For example, the automatic control device 11 uses determining information representing a location where there is a large degree of time-dependent variation in the road condition. When the location represented by the road information matches a location where there is a large degree of time-dependent variation in the road condition represented in the determining information, the automatic control device 11 determines that the reliability of the road information is low. The location where there is a large degree of time-dependent variation in the road condition may be, for example, a location with a statistically high frequency of traffic congestion.

When the automatic control device 11 has determined that the reliability of the road information is low, it decides to interpret the road information at a lower resolution. Interpreting the road information at a lower resolution may be widening the location represented by the road information to include adjacent lanes, or widening it to include the entire road.

In the example shown in FIG. 1, when traffic congestion is present in a traffic lane zone 60 of the lane 52, other vehicles traveling in the lane 52 may move to the lane 51 or lane 53, causing the traffic congestion to spread throughout the entire road including the lanes adjacent to the traffic lane zone 60.

As an example for FIG. 1, when the road information shows that traffic congestion is present in the traffic lane zone 60 of the lane 52, the automatic control device 11 interprets the traffic congestion to be traffic congestion present in the road zone 61 including the traffic lane zone 60. The road zone 61 includes traffic lane zones for the lane 51 and lane 53 adjacent to the traffic lane zone 60.

When the automatic control device 11 has decided to interpret the road information at a lower resolution, it generates a plan to control the vehicle 10, based on the road information interpreted at the lower resolution. For example, the automatic control device 11 may plan to transfer control of the vehicle 10 to the driver before the vehicle 10 reaches the road zone 61.

When reliability of the road information is low at locations outside of the detection range of the sensors mounted in the vehicle 10, the automatic control device 11 generates a plan to control the vehicle 10 in a manner that can adapt to changing road conditions, by interpreting the road information at lower resolution.

In the example shown in FIG. 1, when traffic congestion is present only in the traffic lane zone 60 at the point where the vehicle 10 approaches the road zone 61 and the road zone 61 is included within the detection range of the sensors mounted in the vehicle 10, the automatic control device 11 may change the plan so that the vehicle 10 travels under automatic control.

The automatic control device 11 of the embodiment described above controls the vehicle while interpreting the road information at a lower resolution when the reliability of the road information is low at a location with a large degree of variation in road condition, thereby allowing the vehicle to be controlled in response to road conditions while the vehicle 10 is traveling.

Figure 2:
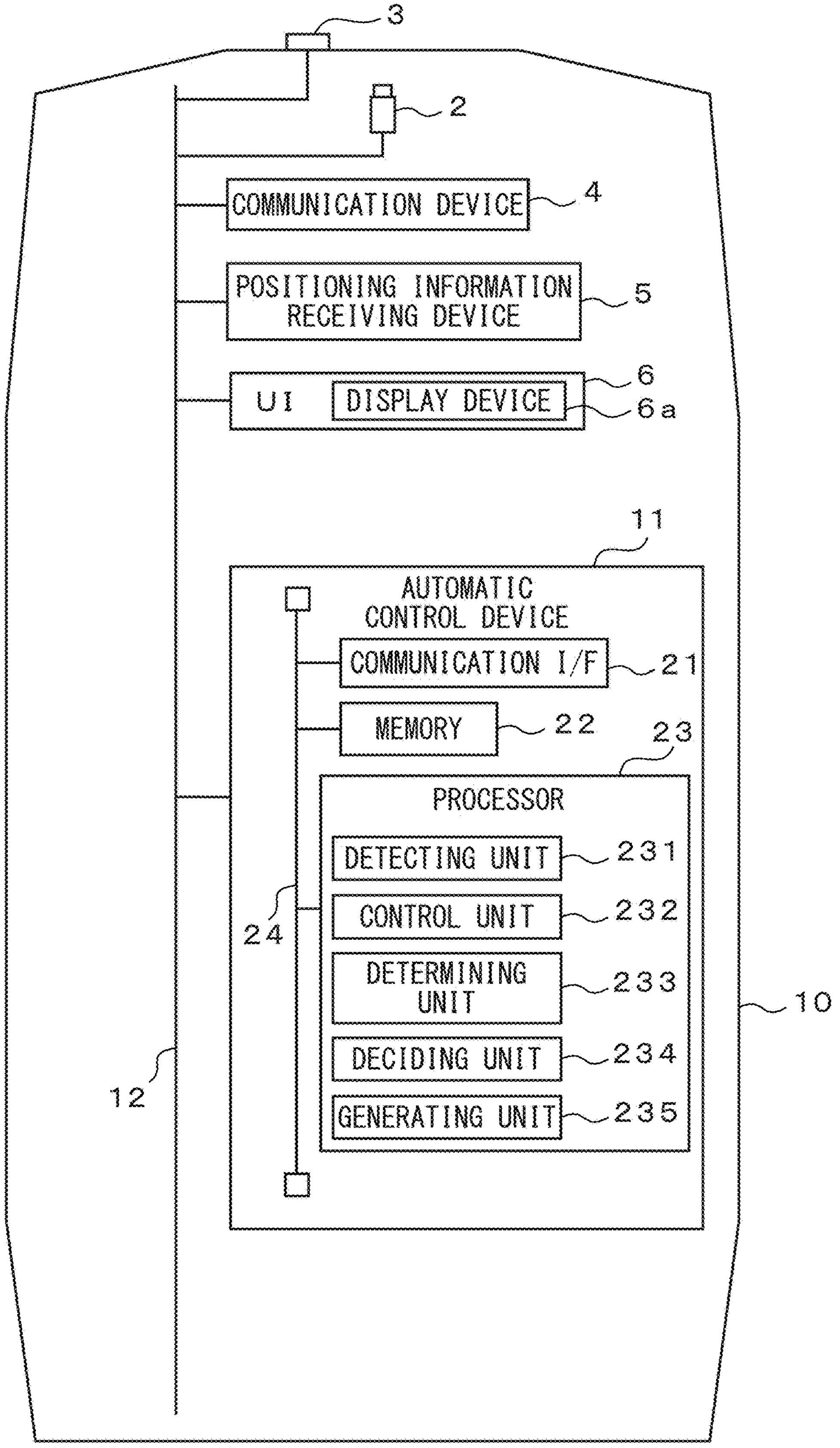
FIG. 2 is a general schematic drawing of a vehicle in which the automatic control device is mounted.

The vehicle 10 in which the automatic control device 11 is mounted will now be explained with reference to FIG. 2. FIG. 2 is a general schematic drawing of a vehicle 10 in which the automatic control device 11 is mounted.

The vehicle 10 has a camera 2, a LiDAR sensor 3, a communication device 4, a positioning information receiving device 5, a user interface (UI) 6 and an automatic control device 11.

The front camera 2, LiDAR sensor 3, communication device 4, positioning information receiving device 5, user interface (UI) 6 and automatic control device 11 are connected in a communicable manner via an in-vehicle network 12 conforming to the Controller Area Network standard.

The camera 2 is mounted inside the vehicle 10 and directed toward the front of the vehicle 10. The camera 2, for example, acquires a camera image in which the environment of a predetermined region ahead of the vehicle 10 is shown, at a predetermined cycle. The camera image is an example of information representing the environment surrounding the vehicle 10. The camera image can show the road in the predetermined region ahead of the vehicle 10, and road features in the area surrounding the road. At the automatic control device 11, the camera image is used for processing to detect objects surrounding the vehicle 10. The object detection distance of the camera 2 may be about 200 m, for example.

The camera 2 has a 2D detector composed of an array of photoelectric conversion elements with visible light sensitivity, such as a CCD or C-MOS, and an imaging optical system that forms an image of the photographed region on the 2D detector.

Each time a camera image is acquired, the camera 2 outputs the camera image and the camera image acquisition time at which the camera image was acquired, through the in-vehicle network 12 to the automatic control device 11.

The LiDAR sensor 3 is mounted on the outer side of the vehicle 10, for example, being directed toward the front of the vehicle 10. The LiDAR sensor 3 emits a scanning laser toward a predetermined visual field in front of the vehicle 10, at a reflected wave information acquisition time set with a predetermined cycle, and receives a reflected wave that has been reflected from a reflector. The time required for the reflected wave to return contains information for the distance between the vehicle 10 and objects located in the direction in which the laser has been emitted. The LiDAR sensor 3 outputs the reflected wave information that includes the laser emission direction and the time required for the reflected wave to return, together with the reflected wave information acquisition time at which the laser was emitted, through the in-vehicle network 12 to the automatic control device 11. At the automatic control device 11, the reflected wave information is used for processing to detect objects surrounding the vehicle 10. The object detection distance of the LiDAR sensor 3 may be 200 m to 1000 m, for example.

The communication device 4 has an interface circuit for connecting the automatic control device 11 to the macrocell base station 41. The communication device 4 is configured in a communicable manner with the server 30 via the macrocell base station 41 and communication network 40. Each time road information is received from the server 30, the communication device 4 outputs the road information to the automatic control device 11 via the in-vehicle network 12.

Roads are represented as a series of road zones in the map information of the server 30 and the automatic control device 11. One traffic lane is represented as a series of traffic lane zones. Each traffic lane zone is associated with the road zone that includes that traffic lane zone.

The road information includes, for example, road locations, as well as vehicle speeds, vehicle spacings, road features, obstacle locations, road surface conditions and traffic congestion conditions for each lane. The speed of the vehicle may be represented as the average speed, or it may be represented as a range with upper and lower limits. The road information contains information representing the time at which the road condition was acquired.

The road information may also represent the road condition of each traffic lane zone. Traffic lane zones are identified by identifying information used to identify the traffic lane zones. The locations of the traffic lane zones are represented on a world coordinate system where the origin is a predetermined location. The road information may also represent the road condition of each road zone. Road zones are identified by identifying information used to identify the road zones. The locations of the road zones are represented on a world coordinate system where the origin is a predetermined location.

The positioning information receiving device 5 outputs positioning information that represents the current location of the vehicle 10. The positioning information receiving device 5 may be a GNSS receiver, for example. The positioning information receiving device 5 outputs the positioning information and the positioning information acquisition time at which the GNSS information has been acquired, to the automatic control device 11, each time GNSS information is acquired at a predetermined receiving cycle. The positioning information includes the current location of the vehicle 10 as represented by world coordinates, for example. The current location of the vehicle 10 includes latitude and longitude, for example.

The UI 6 is an example of a notification unit. The UI 6, controlled by the automatic control device 11, notifies the driver of operating information relating to the vehicle 10. The operating information relating to the vehicle 10 includes traveling information for the vehicle 10. The UI 6 has a display device 6*a* such as a liquid crystal display or touch panel, for display of the operating information. The UI 6 may also have an acoustic output device (not shown) to notify the driver of operating information. The UI 6 also creates an operation signal in response to operation of the vehicle 10 by the driver. The operation information may be, for example, a destination location, transit points, vehicle speed, or a request for transfer of driving mode. The UI 6 also has a touch panel or operating button, for example, as an input device for inputting operation information from the driver to the vehicle 10. The UI 6 outputs the input operation information to the automatic control device 11 via the in-vehicle network 12.

The automatic control device 11 carries out detection processing, control processing, determination processing, decision processing and generation processing. For this purpose, the automatic control device 11 has a communication interface (IF) 21, a memory 22 and a processor 23. The communication IF 21, the memory 22 and the processor 23 are connected via a signal wire 24. The communication IF 21 has an interface circuit to connect the automatic control device 11 with the in-vehicle network 12. The communication IF 21 is an example of an acquisition unit.

The memory 22 is an example of a storage unit, and it has a volatile semiconductor memory and a non-volatile semiconductor memory, for example. The memory 22 stores an application computer program and various data to be used for information processing carried out by the processor 23. The memory 22 stores road information input from the communication device 4. Road information received from the server 30 is also stored in the memory 22.

All or some of the functions of the automatic control device 11 are carried out by functional modules driven by a computer program operating on the processor 23, for example. The processor 23 has a detecting unit 231, a control unit 232, a determining unit 233, a deciding unit 234 and a generating unit 235. Alternatively, the functional module of the processor 23 may be a specialized computing circuit in the processor 23. The processor 23 has one or more CPUs (Central Processing Units) and their peripheral circuits. The processor 23 may also have other computing circuits such as a logical operation unit, numerical calculation unit or graphics processing unit.

The detecting unit 231 detects objects ahead of the vehicle 10 and their types (for example, vehicles), based on the camera image and reflected wave information. Objects also include moving objects such as vehicles traveling ahead of the vehicle 10. The detecting unit 231 has a classifier that detects objects represented in the camera images, by inputting the camera images. As the classifier, the detecting unit 231 may use a deep neural network (DNN), for example, that has been trained to detect objects represented in camera images, from the input camera images, for example.

When a moving object such as a vehicle or person has been detected as an object, the detecting unit 231 also identifies the traveling lane in which the moving object is traveling, based on lane marking lines represented in the map information and the location of the moving object. The detecting unit 231 relays to the control unit 232 the object detection information which includes information indicating the type of the detected object, information indicating its location and the traveling lane, and information representing the camera images in which the objects are represented and the locations of the objects in the camera images.

The map information is stored in the memory 22. In some embodiments, the map information has high-precision map information including three-dimensional information for the road surface, information for the types and locations of road features, curvature radius and structures, such as road lane marking lines, and the legal speed limit for the road.

The control unit 232 controls operation including traveling of the vehicle 10. The control unit 232 has two driving modes with different degrees of driver participation for driving. The control unit 232 controls the operation of the vehicle 10 according to the driving mode.

For example, the control unit 232 has a self-driving mode in which the degree to which the driver participates in driving is low (for example, driving mode with levels 3 to 5) and a manual driving mode in which the degree to which the driver participates in driving is high (for example, driving mode with levels 0 to 2). In self-driving mode, the vehicle 10 is driven primarily by the control unit 232. In manual driving mode, the vehicle 10 is driven primarily by the driver.

In the driving mode in which the degree to which the driver participates in driving is low, all or some of the driving operations necessary for traveling of the vehicle 10 are executed automatically, while in the driving mode in which the degree to which the driver participates in driving is high, the types of driving operations executed automatically are less than in the driving mode in which the degree to which the driver participates in driving is low, or are zero.

In self-driving mode, the control unit 232 generates a driving plan for control of operation including steering, actuation and braking, based on positioning information, map information camera image and reflected wave information, and road information received from the server 30. The control unit 232 outputs the automatic control signal based on the driving plan, to an actuator (not shown) that controls the steering wheel, a drive unit (not shown), or the brake (not shown), via the in-vehicle network 12. The control unit 232 is an example of a planning unit.

In manual driving mode, the control unit 232 generates a manual control signal to control operation of the vehicle 10 such as steering, actuation and braking, based on driver operation, and outputs the manual control signal to an actuator for actuation of the steering wheel, and to a drive unit or brake, via the in-vehicle network 12.

The control unit 232 can drive the vehicle 10 in self-driving mode in regions where self-driving mode is permitted (for example, regions where a high-precision map has been prepared for control of the vehicle 10). In regions where self-driving mode is not permitted, the control unit 232 controls the vehicle 10 in manual driving mode. In response to a driver request, the control unit 232 transfers from self-driving mode to manual driving mode or from manual driving mode to self-driving mode. The control unit 232 also transfers from self-driving mode to manual driving mode when it has determined that the vehicle 10 cannot be safely driven in self-driving mode. The control unit 232 notifies the driver, via the UI 6, regarding transfer from self-driving mode to manual driving mode.

The automatic control device 11 is an electronic control unit (ECU), for example. In FIG. 2, the detecting unit 231, control unit 232, determining unit 233, deciding unit 234 and generating unit 235 were described as being in the same device, but the detecting unit 231 may be provided as a separate device from the other units.

Figure 3:
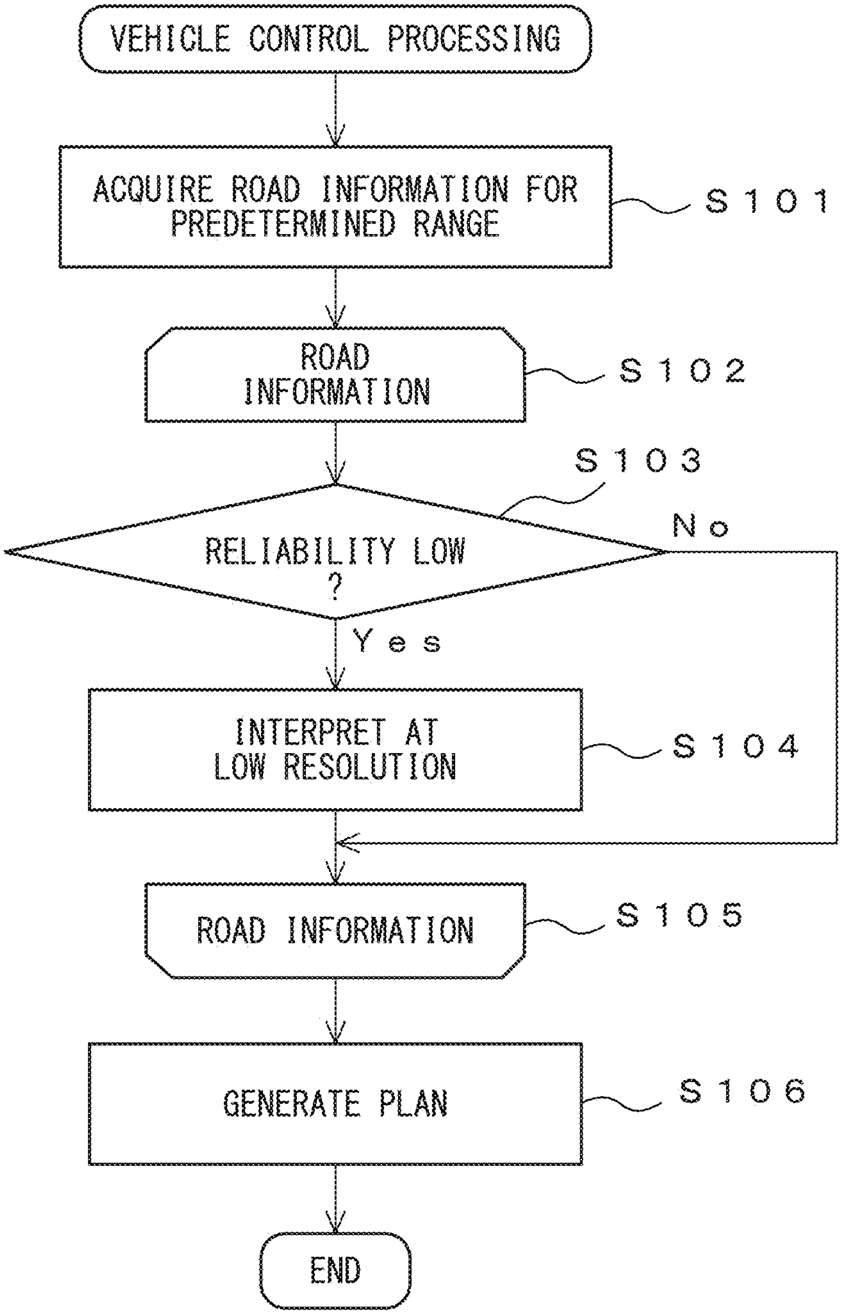
FIG. 3 is an example of an operation flow chart for vehicle control processing by an automatic control device.

FIG. 3 is an example of an operation flow chart for vehicle control processing by an automatic control device 11. Vehicle control processing by the automatic control device 11 will be described below with reference to FIG. 3. The automatic control device 11 carries out vehicle control processing as shown in FIG. 3, at a vehicle control time having a predetermined cycle. The automatic control device 11 may also carry out the vehicle control processing shown in FIG. 3 each time road information is acquired.

In the vehicle control processing shown in FIG. 3, the automatic control device 11 generates a traveling lane plan and a driving mode plan. The condition of the road up to a predetermined distance ahead from the current location of the vehicle 10 in the traveling direction of the vehicle 10 is used for generation of the traveling lane plan and driving mode plan. The predetermined distance may be 2 km to 3 km, for example. Since the condition of the road within this distance cannot be detected by the camera 2 and LiDAR sensor 3, road information received from the server 30 is used to generate the plans. In the vehicle control processing shown in FIG. 3, the road information represents the condition of the road in a single traffic lane zone.

The determining unit 233 first acquires multiple road information items in the range from the current location of the vehicle 10 up to a predetermined distance ahead, from among the items of road information stored in the memory 22 (step S101).

Processing from step S102 to step S105 is then carried out for each acquired item of road information.

The determining unit 233 determines whether the reliability of the road information is high or low, based on determining information representing locations with a large degree of variation in road condition (step S103). This determination processing is described further below.

When the reliability of the road information is low (step S103—Yes), the deciding unit 234 decides to interpret the road information at a lower resolution (step S104). When the reliability of the road information is high (step S103—No), on the other hand, processing proceeds up to step S105.

When a location in the road information is to be interpreted at a low resolution, this may include widening the "road condition" in the traffic lane zone to include any traffic lane zones adjacent at left and right or front and rear, or widening the "road condition" in the traffic lane zone to include the entire road zone. In the example shown in FIG.

Figure 5:
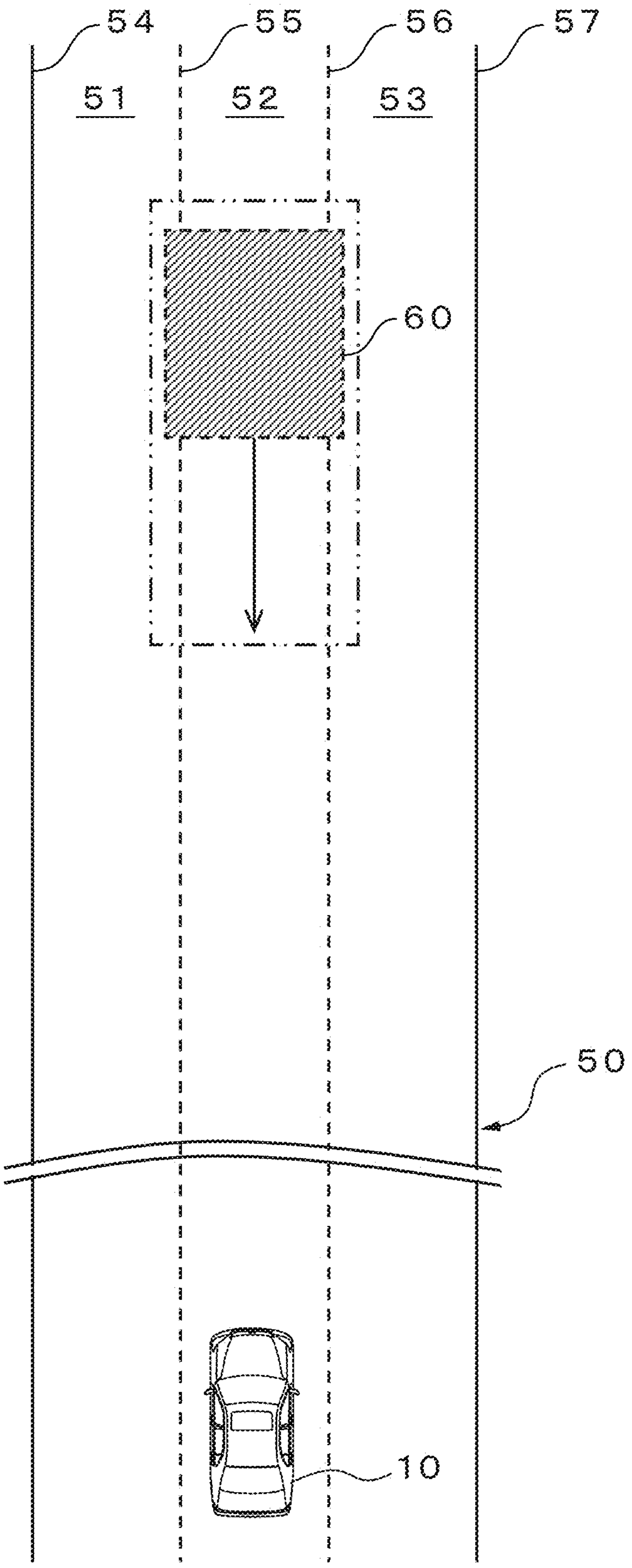
FIG. 5 is a diagram illustrating how road information is interpreted at a low resolution.

1, the road condition of the traffic lane zone 60 has been widened to include traffic lane zones adjacent at left and right. In the example shown in FIG. 5, the road condition of the traffic lane zone 60 has been widened to include a traffic lane zone adjacent at the rear.

When the road information represents the road condition of a single road zone, then interpreting a location within the road information at low resolution may include widening the "road condition" in the road zone to include any road zones adjacent at the front and rear.

Interpreting a location within the road information at low resolution also includes widening the range of the speed of the vehicle in the traffic lane zone or road zone. Widening the range of the speed of the vehicle includes lowering the lower limit for the speed of the vehicle.

After processing has been carried out between step S102 and step S105 for each acquired item of road information, the control unit 232 generates a plan to control the vehicle 10 (step S106), and the series of processing steps is complete. When the control unit 232 has decided to interpret the road information at a lower resolution, it generates a plan to control the vehicle 10, based on the road information interpreted at the lower resolution. For road information with high reliability, the control unit 232 generates a plan to control the vehicle 10, based on the condition of the road represented by the road information. An example of generation of a plan to control the vehicle 10 by the control unit 232, based on road information that has been interpreted at lower resolution will be described below.

When the control unit 232 has generated a plan to control the vehicle 10, based on road information that has been interpreted at lower resolution, it may notify the driver via the UI 6 that the plan has been generated while interpreting the road information at a lower resolution. The driver may feel uncomfortable with operation of the vehicle 10 when the road information was in fact accurate. By notifying the driver that the plan has been generated while interpreting the road information at a lower resolution, the driver may better understand control by the control unit 232.

Specific examples (1) to (4) of the aforementioned determination processing will now be explained.

(1) The determining information represents a location with a large degree of time-dependent variation in the road condition. The determining information is stored in the memory 22. The determining information includes identifying information or coordinates for the traffic lane zone that includes a location with a large degree of time-dependent variation in the road condition. When the identifying information or coordinates for a traffic lane zone within the road information matches the identifying information or coordinates represented by the determining information, the determining unit 233 determines that the reliability of the road information is low. In other cases, the determining unit determines that the reliability of the road information is high.

Large time-dependent change in a road condition may be considered to be when the average speed of the vehicle is equal to or less than a predetermined reference speed and the average vehicle spacing is equal to or less than a predetermined reference distance. The location where there is a large degree of time-dependent variation may be a location where traffic congestion is present. The determining information contains, for example, locations with a high statistical frequency of traffic congestion occurrence.

(2) The determining information represents a location with a large degree of time-dependent variation in the road condition, and a time period. The determining information is stored in the memory 22. The determining information includes identifying information or coordinates for the traffic lane zone that includes the location with a large degree of time-dependent variation. The determining information also includes time periods with large time-dependent change in road conditions, for each location with a large degree of time-dependent variation in the road condition.

When the identifying information or coordinates of a traffic lane zone within the road information matches the identifying information or coordinates represented in the determining information, and the time at which the road condition represented in the road information has been acquired is within a time period of large time-dependent change in the road condition represented in the determining information, the determining unit determines that the reliability of the road information is low. In other cases, the determining unit determines that the reliability of the road information is high. A time period with large time-dependent change in the road condition may be, for example, a morning or evening commuting time period.

Figure 4:
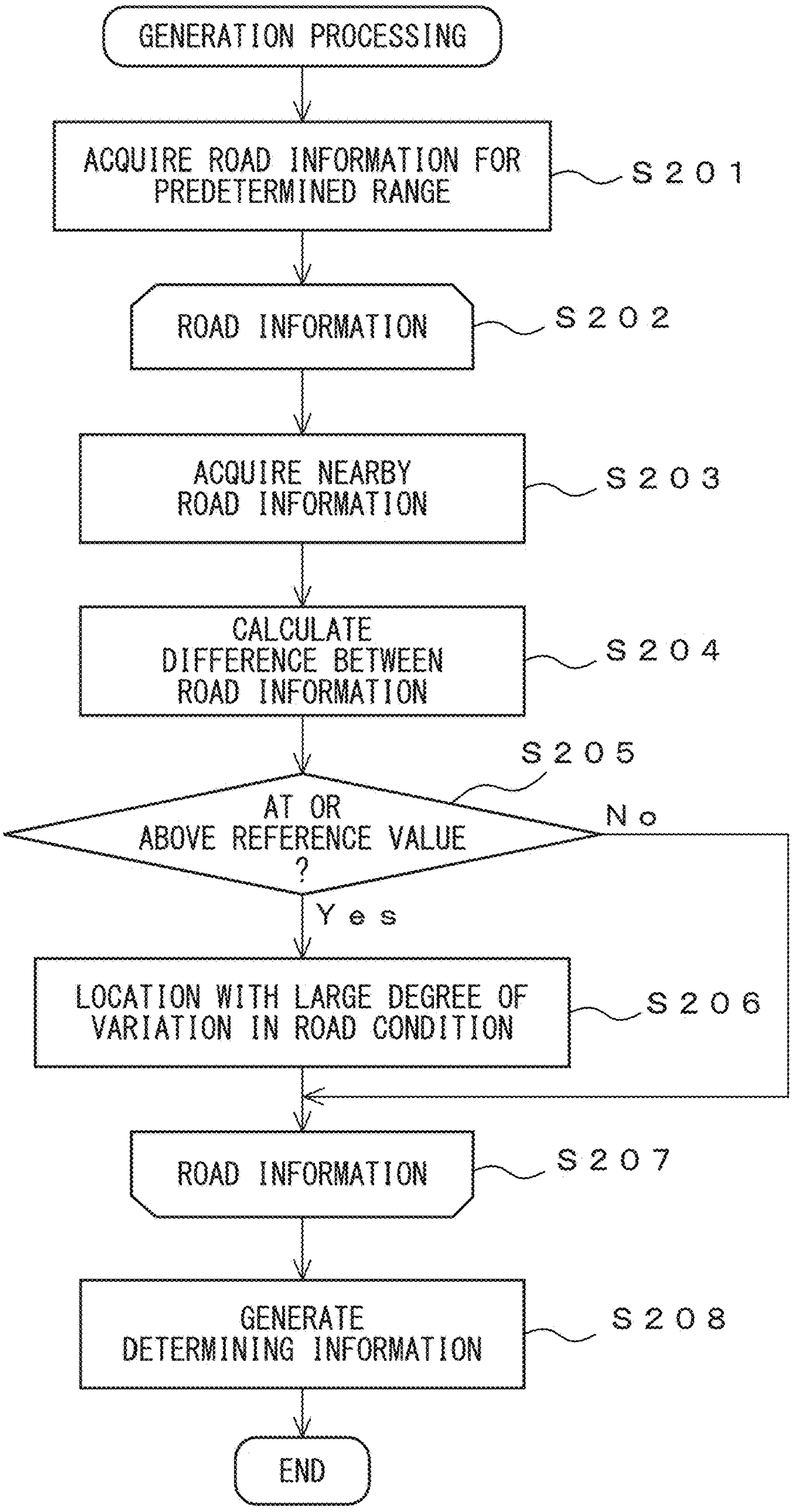
FIG. 4 is an example of an operation flow chart for generation processing by an automatic control device.

(3) The determining unit 233 determines that the reliability of an item of road information is low when a location represented in determining information generated by the generating unit 235 matches a location represented by the road information. FIG. 4 is an example of an operation flow chart for generation processing by an automatic control device. The generating unit 235 carries out the generation processing shown in FIG. 4 at a generation processing time with a predetermined cycle.

The generating unit 235 first acquires multiple road information items in the range from the current location of the vehicle 10 up to a predetermined distance ahead, from among the items of road information stored in the memory 22 (step S201). The predetermined distance may be 2 km to 3 km, for example.

Processing from step S202 to step S207 is then carried out for each acquired item of road information.

The generating unit 235 acquires road information near one location represented by the road information (step S203). For example, the generating unit 235 acquires road information for a traffic lane zone located to the left, right, front or rear of the traffic lane zone represented by the road information.

The generating unit 235 then calculates the difference between the two items of road information (step S204). Specifically, the generating unit 235 calculates the difference between the road conditions in the two traffic lane zones. For example, the generating unit 235 calculates the difference between the average vehicle speeds in the two traffic lane zones.

The generating unit 235 then determines whether or not the difference between the two items of road information is equal to or greater than a reference value (step S205). For example, the generating unit 235 determines whether or not the difference between the average vehicle speeds in the two traffic lane zones is equal to or greater than a reference value. The reference value may be 15 km/h, for example.

When the difference between the two items of road information is equal to or greater than the reference value (step S205—Yes), the generating unit 235 determines that one traffic lane zone is at a location with a large degree of variation in road condition (step S206). That the difference between the average vehicle speeds in two traffic lane zones is equal to or greater than the reference value suggests that one of the traffic lane zones is congested while the other traffic lane zone is not congested.

When the difference between the two items of road information is not equal to or greater than the reference value (step S205—No), processing proceeds up to step S207.

After processing between step S202 and step S207 has been carried out for each of multiple acquired items of road information, the control unit 232 generates determining information representing locations with a large degree of variation in road condition (step S208), and the series of processing steps is complete. The determining information contains the locations of traffic lane zones that have been determined to be locations with a large degree of variation in road condition in step S206 described above.

The determining unit 233 determines that the reliability of an item of road information is low when a location represented in determining information generated by the generating unit 235 matches a location represented by the road information. When the speeds of vehicles in adjacent lanes on a road are significantly different, the speeds of the vehicles on the road as a whole may decrease as time progresses, causing the speeds of the vehicles in different lanes to average out. The reliability of the road information is therefore determined to be low, and the condition of the road in the different traffic lane zones is interpreted at a low resolution.

In the example described above, the generating unit 235 used average vehicle speed between traffic lane zones as the road information, but the road information is not limited to this example. The road information used may also be the average inter-vehicular distance for different traffic lane zones, for example.

(4) The determining information represents a location with a large degree of variation in the curvature radius of the road. For example, the determining information may contain locations where the curvature radius of the road is smaller than a reference curvature radius. Throughout the present specification, a location where the curvature radius of the road is smaller than a reference curvature radius is a location with a greater degree of variation in the curvature radius of the road. The determining unit 233 determines whether or not the location represented by the road information matches a location with a large degree of variation in curvature radius among the locations represented in the determining information. When the location represented by the road information matches a location with a large degree of variation in curvature radius among the locations represented in the determining information, the determining unit 233 determines whether or not the speed of the vehicle in the road information exceeds a reference speed calculated, based on the reference curvature radius. When the speed of the vehicle in the road information exceeds the reference speed, the determining unit 233 determines that the reliability of the road information is low. The determining unit 233 may also determine whether or not the speed of the vehicle in the road information exceeds a value obtained by adding a predetermined offset to the reference speed.

The reference speed is calculated, based on the lateral acceleration allowing the vehicle to move, the mass of the vehicle 10 and the reference curvature radius. A vehicle speed in road information is normally not expected to exceed the reference speed. Therefore, when the speed of the vehicle in the road information exceeds the reference speed, it is determined that the reliability of the road information is low. This completes explanation of a concrete example of determination processing.

Generation of a plan to control the vehicle 10 by the control unit 232, based on road information that has been interpreted at lower resolution will now be described.

Generation of a plan to control the vehicle, based on road information that has been interpreted at lower resolution includes generation of a lane change plan. In this case the start location for a lane change may be set early in order to allow exiting at a branching point.

Figure 6:
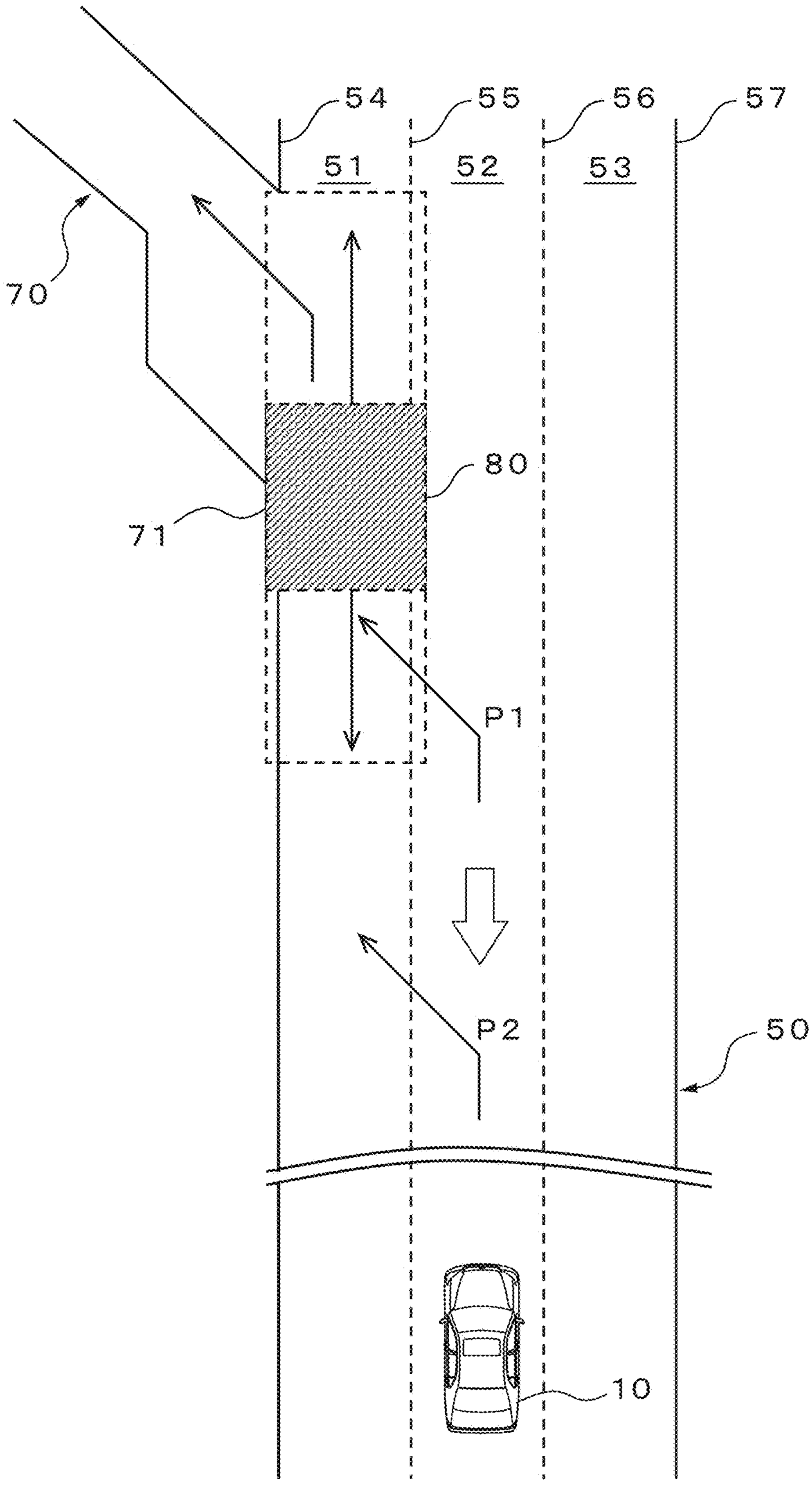
FIG. 6 is a diagram illustrating generation of a plan for control of a vehicle.

FIG. 6 is a diagram illustrating generation of a plan for control of a vehicle 10. The vehicle 10 plans to exit from the road 50 to a road 70 at a branching location 71. The vehicle 10 is traveling on the lane 52. The control unit 232 generates a lane change plan for exiting from the lane 51 to the road 70 after having moved from the lane 52 to the lane 51. When there is no traffic congestion in the road 50, the control unit 232 generates a lane change plan for movement from the lane 52 to the lane 51 at a location P1.

The determining unit 233 has determined that the reliability of the road information indicating traffic congestion in the traffic lane zone 80 near the branching location 71 is low. The deciding unit 234 has therefore decided to interpret the road information at a lower resolution, and has interpreted the state of traffic congestion in the traffic lane zone 80 to include the traffic lane zones adjacent at the front and rear.

When it is attempted to move from the lane 52 to the lane 51 at location P1, since the vehicle 10 is moving toward the congested lane 51 it is difficult to make a lane change in self-driving mode.

The control unit 232 therefore generates a lane change plan for movement from the lane 52 to the lane 51 at a location P2, before the location of traffic congestion. The vehicle 10 can thus safely carry out a lane change in self-driving mode, since the vehicle 10 is moving toward the lane 51 where it is not congested.

The generation of a plan to control the vehicle, based on the road information that has been interpreted at lower resolution may in some cases be a lane change with a later start location so that the lane change is made after congestion. In such cases the location where the lane change has been planned may be one within traffic congestion, as a result of interpreting the road information at lower resolution. It may thus be possible to more quickly reach the destination location by making a lane change after having traveled in the current traveling lane and passed the traffic congestion.

In addition, generating a plan to control the vehicle 10, based on road information that has been interpreted at lower resolution may involve changing the control mode to increase the degree of driver participation in driving. Changing the control mode to increase the degree of driver participation in driving includes stopping self-driving, requesting hands-on driving and/or changing the self-driving level.

Control modes for lane changes include non-approval mode, proposal-approval mode, driver trigger mode and manual control mode. In non-approval mode, a lane change that has been determined to require by the control unit 232 is carried out by the control unit 232 without receiving approval by the driver. In proposal-approval mode, a lane change that has been determined to require by the control unit 232 is carried out by the control unit 232 after having received approval by the driver. In driver trigger mode, a lane change that has been determined to require by the driver is carried out by the control unit 232. In manual control mode, the driver carries out a lane change when the control unit 232 has given the driver a notification for carrying out a lane change, and the driver has determined that the lane change is necessary. This concludes explanation of generating a plan to control the vehicle 10, based on road information that has been interpreted at lower resolution.

The automatic control device of the embodiment described in detail above controls the vehicle while interpreting the road information at a lower resolution when the reliability of the road information is low at a location with a large degree of variation in road condition, thereby allowing the vehicle to be controlled in response to road conditions while the vehicle is traveling.

The vehicle control device according to the embodiment described above may incorporate appropriate modifications that are still within the gist of the present disclosure. Moreover, the technical scope of the present disclosure is not limited to the embodiments described herein and includes the present disclosure and its equivalents as laid out in the Claims.

For example, in the embodiment described above, road information may be interpreted at a lower resolution, based on detection information by sensors mounted in the vehicle 10.

For example, road information may be interpreted at a lower resolution when the speed of the vehicle 10 is faster than a predetermined reference speed. This is because when the speed of the vehicle 10 is slower the driver has greater ability to be involved in driving, whereas when the speed of the vehicle 10 is faster the driver has less ability to be involved in driving.

The road information may also be interpreted at lower resolution, based on the speed of another vehicle around the vehicle 10. Specifically, the road information may be interpreted at lower resolution at a location outside of the sensor detection range when the speed of another vehicle around the vehicle 10 that has been acquired from the road information differs from the speed of the other vehicle as detected by the sensors mounted in the vehicle 10. For example, the difference between the speed of another vehicle around the vehicle 10 that has been acquired in the road information and the speed of the other vehicle as detected by the sensors mounted in the vehicle 10 may be provided as an offset with respect to a speed in the road information for a region outside of the sensor detection range.

The invention claimed is:

1. A vehicle control device comprising:

a processor configured to acquire road information for a location outside of a detection range of a sensor mounted in a vehicle, determine whether reliability of the road information is high or low, based on determining information representing a location with a large degree of variation in road condition, decide to interpret the road information at a lower resolution when it has been determined that the reliability of the road information is low, and generate a plan to control the vehicle, based on the road information that has been interpreted at lower resolution, when it has been decided to interpret the road information at a lower resolution.

2. The vehicle control device according to claim 1, wherein the determining information represents locations where there is a large degree of time-dependent variation in the road condition, and the processor is further configured to determine that the reliability of the road information is low when the location represented by the road information matches a location where there is a large degree of time-dependent variation in the road condition represented in the determining information.

3. The vehicle control device according to claim 1, wherein the determining information represents locations and time periods where there is a large degree of time-dependent variation in the road condition, and the processor is further configured to determine that the reliability of the road information is low when the location represented by the road information matches a location where there is a large degree of time-dependent variation in the road condition represented in the determining information, and the time at which the road information was acquired is within a time period with a large degree of time-dependent change in the road condition represented in the determining information.

4. The vehicle control device according to claim 1, wherein the processor is further configured to generate determining information representing locations with a large degree of variation in road condition, between the locations as represented by the road information and areas near the locations represented by the road information, and to determine that the reliability of the road information is low when a location represented in the generated determining information matches a location represented by the road information.

5. The vehicle control device according to claim 1, wherein the determining information represents locations where there is a large degree of variation in curvature radius of a road, and the processor is further configured to determine that the reliability of the road information is low when the location represented by the road information matches a location where there is a large degree of variation in curvature radius represented in the determining information, and the speed of another vehicle in the road information exceeds a reference speed estimated, based on a reference curvature radius.

* * * * *